United States Patent
Pitko et al.

(12) 
(10) Patent No.: US 12,049,578 B2
(45) Date of Patent: Jul. 30, 2024

(54) RECYCLABLE OLEFIN BASED HOT MELT PRESSURE SENSITIVE ADHESIVE LABEL AND METHODS OF MAKING AND USING THEREOF

(71) Applicant: Avery Dennison Corporation, Mentor, OH (US)

(72) Inventors: Jarkko T. Pitko, Wassenaar (NL); Sebastiaan B. Damman, Leiden (NL)

(73) Assignee: Avery Dennison Corporation, Mentor, OH (US)

( * ) Notice: Subject to any disclaimer, the term of this patent is extended or adjusted under 35 U.S.C. 154(b) by 0 days.

(21) Appl. No.: 17/381,402

(22) Filed: Jul. 21, 2021

(65) Prior Publication Data

US 2022/0017791 A1    Jan. 20, 2022

Related U.S. Application Data

(60) Provisional application No. 63/052,544, filed on Jul. 16, 2020.

(51) Int. Cl.
| | | |
|---|---|---|
| *C09J 7/35* | (2018.01) | |
| *C08K 5/00* | (2006.01) | |
| *C08K 5/01* | (2006.01) | |
| *C08L 23/08* | (2006.01) | |
| *C08L 23/22* | (2006.01) | |
| *C08L 53/00* | (2006.01) | |
| *C09J 7/38* | (2018.01) | |
| *G09F 3/10* | (2006.01) | |

(52) U.S. Cl.
CPC ............... *C09J 7/387* (2018.01); *C08K 5/005* (2013.01); *C08K 5/01* (2013.01); *C08L 23/0815* (2013.01); *C08L 23/22* (2013.01); *C08L 53/005* (2013.01); *G09F 3/10* (2013.01); *C08L 2207/062* (2013.01); *C08L 2207/20* (2013.01); *C09J 2203/334* (2013.01); *C09J 2301/122* (2020.08); *C09J 2301/302* (2020.08); *C09J 2301/304* (2020.08); *C09J 2301/408* (2020.08); *C09J 2423/046* (2013.01); *C09J 2423/106* (2013.01); *Y10T 428/28* (2015.01)

(58) Field of Classification Search
None
See application file for complete search history.

(56) References Cited

U.S. PATENT DOCUMENTS

| | | | |
|---|---|---|---|
| 6,582,829 | B1 | 6/2003 | Quinn et al. |
| 10,233,363 | B2 | 3/2019 | Jin et al. |
| 2004/0191459 | A1 | 9/2004 | Driesten et al. |
| 2006/0079617 | A1 | 4/2006 | Kappes et al. |
| 2006/0229411 | A1 | 10/2006 | Hatfield et al. |
| 2007/0135563 | A1 | 6/2007 | Simmons et al. |
| 2014/0350155 | A1* | 11/2014 | Hamann ............ C09J 157/02 524/226 |
| 2016/0102228 | A1 | 4/2016 | Thatcher et al. |
| 2017/0292048 | A1 | 10/2017 | Pitko |
| 2020/0123418 | A1 | 4/2020 | Kakuda et al. |

FOREIGN PATENT DOCUMENTS

| | | |
|---|---|---|
| EP | 3243886 | 11/2017 |
| WO | 2018/145257 | 8/2018 |
| WO | 2019/210120 | 10/2019 |
| WO | 2020/019146 | 1/2020 |
| WO | 2020/121278 | 6/2020 |
| WO | 2021/108160 | 6/2021 |
| WO | 2021/245330 | 12/2021 |
| WO | 2021/245331 | 12/2021 |

OTHER PUBLICATIONS

International Search Report and Written Opinion dated May 2, 2022 issued in corresponding IA No. PCT/US2021/042479 filed Jul. 21, 2021.

* cited by examiner

*Primary Examiner* — Anish P Desai

(57) ABSTRACT

A pressure sensitive hot melt adhesive is provided including at least one olefin block copolymer, a hydrogenated hydrocarbon tackifier, and a plasticizer. The adhesive is free from any oil containing constituents and the pressure sensitive label with the adhesive exhibits desired adhesion performance in low temperature as well as in normal temperature for a host of different substrates. The adhesive also resistant to yellowing, water-whitening and is non-swelling. The adhesive and the label enables recycling in recycling streams when the face material and/or substrate being labeled is also of olefin based material.

33 Claims, 1 Drawing Sheet

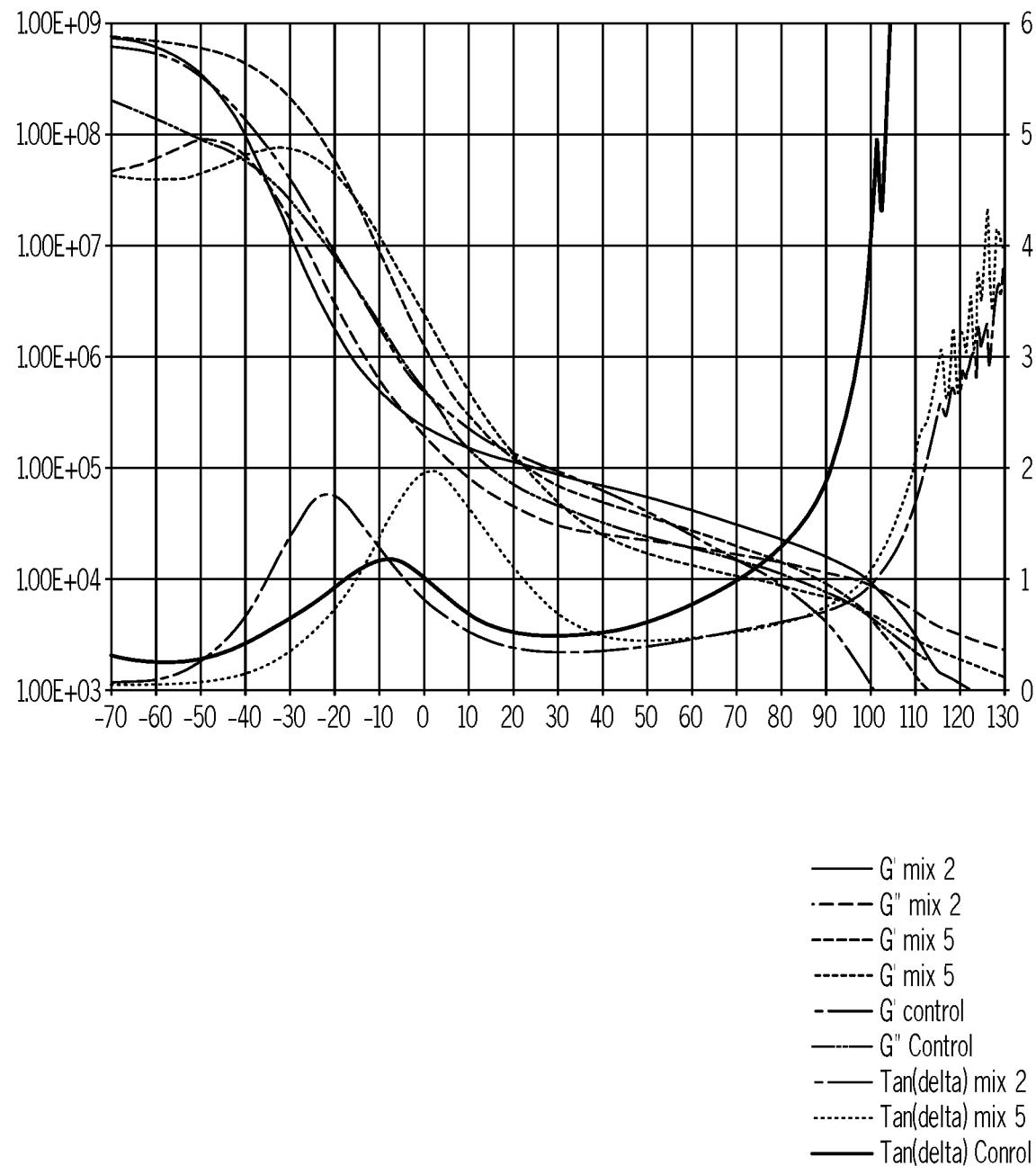

RECYCLABLE OLEFIN BASED HOT MELT PRESSURE SENSITIVE ADHESIVE LABEL AND METHODS OF MAKING AND USING THEREOF

CROSS-REFERENCE TO RELATED APPLICATION

The present application claims the benefit of U.S. Provisional Patent Application No. 63/052,544 filed Jul. 16, 2020, which is incorporated herein by reference in its entirety.

FIELD

The present application relates generally to hot melt pressure sensitive adhesives containing olefin-based polymer (OBP) and, in particular, to a hot melt adhesive that exhibits improved performance and enables recycling. The application also relates to pressure sensitive labels containing the hot melt adhesives.

BACKGROUND

Hot melt pressure-sensitive adhesives (PSAs or HMPSAs) are known to adhere to a variety of substrates, particularly when applied at room temperature. PSAs exhibit instantaneous adhesion to the substrate when slight pressure is applied. PSAs are typically easy to handle in solid form quickly form adhesive bonds without significant supplementary processing and, have a long shelf life. PSAs provide a convenient and economical way to label articles of commerce or packaging containing the same, such as glass, metal, and plastic. PSAs are widely used for the manufacture of self-adhesive labels, which are fastened to articles for the purpose of presenting information (such as a description, content, manufacturing details and price) and/or for decorative purposes.

Hot melt pressure sensitive adhesives (HMPSAs) are also known in the art. However, HMPSAs often fail to achieve certain performance criteria, such as adhesion in low temperature and serviceability over a broad temperature range. Certain HMPSA adhere to a limited number of substrates and cannot accommodate multiple substrates, for example, exhibiting undesirable long dwell/resting times in order to bond acceptably. Aesthetics parameters, such as optical clarity, can be challenging as HMPSAs tend to undergo yellowing as the adhesive ages and/or upon exposure to UV light from exposure to light/sun. Such yellowing is undesirable, particularly for applications involving transparent labels.

HMPSAs, in general, and particularly those based on styrenic block copolymers (SBCs), exhibit good adhesion at low temperatures if the adhesives contain an oil plasticizer. However, inclusion of an oil plasticizer can lead to other undesirable properties, namely chemical reactions with the filmic face material resulting in swelling. For example, certain plastic facestocks used in the construction of labels are prone to swelling when coated with an adhesive composition that includes oil based plasticizers. This swelling can degrade both the appearance and the performance of the label. For applications such as labelling of food or beverage containers that will be subjected to refrigeration or freezer temperatures, the inclusion of such plasticizers is undesirable.

Further, the increasing use of polymer packaging, including labels, contributes to the ever growing amount of waste material found in landfills. Such materials can be difficult to recycle since the label material, including the adhesive, must be removed from the packaging/container prior to recycling of the packaging/container.

Used labelled packages and/or containers can be cleaned for reuse or recycled to recover the materials used to prepare the packaging and containers. Commercial cleaning and recycling processes require the label, including the adhesive, to be completely separated from the article to which it is adhered, without leaving adhesive residues on the surface of the article. But this approach of separation of the label increases the complexity of recycling rather than simplifying it. In light of the above, there is a need for effective solution for recycling packaging materials, particularly those that contain labels adhered thereto.

For at least these reasons and others, a need exists for improved HMPSAs that exhibit excellent adhesive performance at low temperatures, accommodate multiple substrates, and make the recycling of plastic packaging articles more efficient and cost effective.

SUMMARY

Hot melt pressure sensitive adhesives (HMPSAs) containing one or more olefin block copolymers (OBC); one or more hydrogenated hydrocarbon tackifiers; and one or more plasticizers are described herein. In some embodiments, the HMPSA is free from any oil-containing constituents.

In some embodiments, the OBC contains at least one crystalline ethylene block and at least one $C_3$-$C_{20}$ alpha-olefin block.

In some embodiments, the HMPSA contains from about 20 wt % to about 40 wt % of the OBC. In some embodiments, the HMPSA contains less than about 30% by weight of the olefin block copolymer.

In some embodiments, the olefin block copolymer has a density in the range from 0.8624 g/cm$^3$ to 0.8675 g/cm$^3$ and a melt temperature in the range from 115° C. to 120° C. In some embodiments, the olefin block copolymer has a glass transition temperature within a range of from about −60° C. to about −40° C. In some embodiments, the olefin block copopolymer is a fully hydrogenated olefin block copolymer.

The amount of the tackifier and the plasticizer can vary. In some embodiments, the hot melt pressure sensitive adhesive contains from about 35 wt % to about 55 wt % of a tackifier and from about 10 wt % to about 35 wt % of plasticizer.

The physical and chemical properties of the HMPSA can vary depending on the application. In some embodiments, the HMPSA has (1) a glass transition temperature (Tg) from about −35° C. to about 0° C.; (2) a dynamic shear of at least about 40 N/inch; (3) a viscosity from about 20000 cP to about 30000 cP when measured at 160° C.; (4) an elastic modulus (G') of less than the Dahlquist criterion value of $3\times10^5$ Pa at room temperature; and/or (5) an elastic modulus (G') in the range from 90000 Pa-110000 Pa at room temperature.

The HMPSA can further contain one or more additives, such as one or more antioxidants. In some embodiments, the HMPSA contains at least 0.5 wt % of antioxidant.

In another aspect of the subject matter a pressure sensitive labels including a face stock layer and a pressure sensitive adhesive layer disposed of on the face stock are described herein. The face stock and the pressure sensitive adhesive contain one or more olefin based polymers. The pressure sensitive adhesive is a HMPSA, and the HMPSA is free of any oil containing constituents. The HMPSA can have at least one olefin block copolymer; a hydrogenated hydrocarbon tackifier; and a plasticizer as described above. The pressure sensitive adhesive may have one or more of the chemical and physical properties described above.

The label can exhibit a variety of properties. In some embodiments, the pressure sensitive label has an initial adhesion to cardboard at 23° C. from about 4 N/inch to about 9N/inch, and final adhesion after 24 hours at 23° C. from about 3 N/inch to about 6 N/inch when measured according to FTM 9.

In some embodiments, the pressure sensitive label has an adhesion at −5° C. to high-density polyethylene (HDPE) from about 0.3N/inch to about 4 N/inch, and adhesion at 40° C. to HDPE from about 8 N/inch to about 12 N/inch when measured according to FTM 9. In other embodiments, the pressure sensitive label has an initial adhesion to HDPE at 23° C. from about 6 N/inch to about 13 N/inch and a final adhesion after 24 hours at 23° C. from about 9 N/inch to about 14 N/inch when measured according to FTM 9.

The coat weight of the HMPSA can vary. In some embodiments, the pressure sensitive label can have coat weight of the adhesive from about 8 gsm to about 25 gsm.

The face stock can contain a variety of materials know in the art. In some embodiments, the fact stock is or contains a polyolefin, a polyester, a polyamide, or combinations thereof. Exemplary polyolefins include, but are not limited to, polyethylene, polypropylene, copolymers thereof, or combinations thereof. Exemplary polyesters include, but are not limited to, poly (ethylene terephthalate) (PET).

The pressure sensitive label may further contain a release liner at least partially covering the adhesive disposed of on the face stock.

In yet another aspect of the subject matter a labelled article is provided involving an article defining an outer surface; and a label as described above attached to the article along the outer surface of the article; wherein the article contains a polyolefin. The article can contain HDPE and/or PP. The labelled article can be recycled in recycling streams of material selected at least from HDPE or PP or others or any combination thereof.

BRIEF DESCRIPTION OF THE DRAWING

The subject matter of the invention is described in detail below with reference to the appended drawing in FIG. 1 which illustrates the viscoelastic profile of the hot melt pressure sensitive adhesive (HMPSA)/label containing the OBC polymer.

DETAILED DESCRIPTION

Hot melt pressure sensitive adhesives (HMPSAs) that provide advantageous performance characteristics, including improved low temperature performance and adhesion to a host of different substrate (e.g., cardboards and plastics), non-yellowing effect and optical clarity, non-swelling properties and resistance to water whitening are described herein. These characteristics can be particularly important when the HMPSAs are utilized for refrigerated or frozen food container labels such as cheese and deli meats; film covering for food trays, sealing labels for cardboards and PET food trays at room temperature, and labels for containers that are to be recycled.

As noted herein, several conventional HMPSAs are known. Many of these HMPSAs however, were developed for general purpose applications and do not account for adhesive performance in low temperature applications; and resistance to swelling, water-whitening, and yellowing, nor are they intended to facilitate ease of recycling in the recycling streams of plastics. In fact, many conventional components used in HMPSAs to contribute to the adhesion properties often have detrimental effects on the mentioned qualities. For instance, SBCs used in conventional HMPSA can show low temperature adhesion if plasticizers are included. However, plasticizers cause chemical reactions with filmic face stock materials resulting in swelling and labels with such adhesive when used in a refrigerated condition become unacceptable. When incorporated into the formulation such as adhesive formulation, plasticizers separate the main polymer chains and enable their deformation to be more easily accomplished. In this way, plasticizers can improve the processing characteristics of the adhesive as well as the end-properties. Petroleum oils are the large volume plasticizer used in HMPSAs conventionally owing to better availability, compatibility, desirable compounding characteristics with SBCs and being cost competitive. It is believed that the such plasticizers can penetrate a thin and flexible facestock film of a label material, such as a polyethylene plastic film, resulting in a swelling effect typically observed within weeks after application. This swelling can create a rippled and irregular appearance in the facestock, and can also lead to delamination from, for example, an attached liner. Thus, reduction of swelling is highly desirable to improve the quality of the resultant labels. Furthermore, the presence of unsaturated constituents in conventional HMPSAs, such as styrene-butadiene-styrene or styrene-isoprene-styrene (SBS/SIS), allows UV rays to cause yellowing of the adhesive and the label which is undesirable in many applications, such as beverage applications. In view of the above, the present subject matter devises an approach to avoid using plasticizer oil or oil free plasticizer component.

Incorporating olefin block copolymers (OBCs) provide HMPSAs that demonstrate highly desirable combinations of performance characteristics, e.g., good adhesion/tack strength both in low temperature and room temperature for a host of different substrates, non-yellowing and improved clarity, non-swelling property, resistance to water whitening, and combinations thereof. Beneficially, it is surprisingly found that when the adhesive so designed is used along with a filmic face material of polyolefin material in a pressure sensitive label, recycling of the label is enabled/improved when the substrate being labeled also contains polyolefin based materials.

In particular, it has been found that a HMPSA, containing one or more OBCs, a tackifier, and a plasticizer unexpectedly provides the aforementioned combination of performance characteristics. In some embodiments, the OBC, contains semi-crystalline 'hard blocks' and elastomeric 'soft blocks', enabling to exhibit unique properties for the intended applications as mentioned herein. The hard blocks or segments provide a high melting temperature, while the soft blocks or segments maintain the overall polymer elastic properties. The OBCs provide improved thermal stability and increased melting temperature of the adhesive resulting in a wide spectrum of serviceability of the adhesive and improved compatibility of the adhesives/labels in the recycling process for plastics. In some embodiments, the polymer is fully hydrogenated allowing the adhesive to have better chemical and UV resistance. In contrast, conventional HMPSAs containing SBCs are more expensive than similar OBCs if the SBCs need to be fully hydrogenated.

I. Hot Melt Pressure Sensitive Adhesives (HMPSAS)

In one aspect, the subject matter relates to HMPSAs which includes one or more olefin block copolymers (OBCs)

as thermoplastic polymers, a tackifier, and a plasticizer. It is believed that the selection of the chemistry of the ingredients, their proportions and various physical characteristics which all are described hereinafter, have surprising resulted in an adhesive that display excellent adhesion property at low temperature (e.g., about 5° C. to 15° C.) and at room temperature (e.g., about 15° C. to 25° C.); adhesion to a variety of substrates, including to cardboard and HDPE/PE as well as apolar substrates; reduced- or non-swelling; and enabled recycling of the adhesive along with the container to which it is adhered in recycling streams/processes.

In some embodiments, the OBC in the adhesive is present in an amount from about 20 wt % to about 40 wt %. In terms of upper limit, the OBC is present in an amount lower than about 40 wt %, or lower than about 30 wt %, or lower than about 25 wt %. In terms of lower limit, the OBC is present in an amount greater than about 20 wt %, or greater than about 25 wt %, or greater than about 30 wt %, or greater than about 35 wt % according to an embodiment herein.

In certain aspects, the OBC includes at least one crystalline ethylene block or segment and another block including at least one $C_3$-$C_{20}$ alpha-olefin. The crystalline ethylene hard block can be present in an amount of less than about 30% by weight of the olefin block copolymer.

In some embodiments, the OBC has a density from about 0.8624 $g/cm^3$ to about 0.8675 $g/cm^3$. In terms of upper limit, the OBC has a density lower than about 0.8675 $g/cm^3$, or lower than about 0.8660 $g/cm^3$, or lower than about 0.8650 $g/cm^3$, or lower than about 0.8640 $g/cm^3$, or lower than about 0.8630 $g/cm^3$. In terms of lower limit, the OBC has a density greater than about 0.8624 $g/cm^3$, or greater than about 0.8635 $g/cm^3$, or greater than about 0.8645 $g/cm^3$, or greater than about 0.8655 $g/cm^3$, or greater than about 0.8665 $g/cm^3$ according to an embodiment herein.

In some aspects, the OBC has a melt temperature in the range from about 105° C. to about 130° C., e.g. from about 110° C. to about 125° C., or from about 115° C. to about 120° C. In terms of upper limit, the OBC can have melt temperature lower than about 130° C., or lower than about 125° C., or lower than about 120° C., or lower than about 110° C. In terms of lower limit, the OBC can have melt temperature greater than about 105° C., or greater than about 115° C., or greater than about 125° C.

The OBC can have glass transition temperature (Tg) ranging from about −60° C. to about −40° C., e.g., from about −55° C. to about −45° C., from about −50° C. to about −40° C. In terms of upper limit, the OBC can have Tg lower than about −40° C., or lower than about −45° C., or lower than about −50°. In terms of lower limit, the Tg of the OBC can be greater than about −60° C., or greater than about −55° C. according to an embodiment herein.

In some embodiments, the OBC includes a fully hydrogenated olefin block copolymer. Commercially available polymers are sold under the tradename Dow Infuse D9348.15 or equivalent.

In some aspects, the tackifier is present in the adhesive in an amount from about 25 wt % to about 65 wt %, e.g., from about 30 wt % to about 60 wt %, from about 35 wt % to about 55 wt %. In terms of upper limit, the tackifier can be present in amounts lower than about 65 wt %, or lower than about 55 wt %, or lower than about 50 wt %, or lower than about 45 wt %, or lower than about 40 wt %, or lower than about 35 wt %, or lower than about 30 wt %. In terms of lower limit, the tackifier can be present in amounts greater than about 25 wt %, or greater than about 35 wt %, or greater than about 45 wt %, or greater than about 50 wt %, or greater than about 55 wt %.

The tackifier as utilized in certain embodiments is a hydrogenated hydrocarbon tackifier such as Escorez 5300— 41.4% or similar commercially available tackifier.

In certain embodiments, the plasticizer in the adhesive is present in an amount from about 5 wt % to about 40 wt %, e.g., from about 10 wt % to about 35 wt %. In terms of upper limit, the tackifier is present in amounts lower than about 40 wt %, or lower than about 35 wt %, or lower than about 30 wt %, or lower than about 25 wt %, or lower than about 20 wt %, or lower than about 15 wt %. In terms of upper limit, the tackifier is present in amounts greater than about 5 wt %, or greater than about 15 wt %, or greater than about 20 wt %, or greater than about 30 wt %.

The plasticizer utilized here is one or more polybutenes and polyisobutene (PB and PIB respectively), such as Indopol® H-100 or similar commercially available plasticizer. It has been found that the use of polybutenes, which is free of oil constituents, as plasticizers provides for labels that demonstrate reduced facestock swelling. Importantly, these polyisobutylene plasticizers are still capable of advantageously reducing the modulus of an adhesive, while simultaneously decreasing the magnitude of facestock swelling when used in label constructions. According to an advantageous aspect, the HMPSA of the present subject matter is (substantially) free of any processing oil such as petroleum oil or free from oil containing constituents. According to a particular aspect, the pressure sensitive adhesive of the present disclosure is (substantially) free of mineral (hydrocarbon) oil, in particular (substantially) free of paraffinic or naphthenic oils.

The HMPSA in certain embodiments has a glass transition temperature in the range from about −40° C. to about 0° C., e.g., from about −35° C. to about 0° C., from about −30° C. to about 0° C.

In some embodiments, the dynamic shear as exhibited by the HMPSA is at least about 40 N/inch as measured using the FTM 18 method.

The viscosity of the HMPSA is from about 15000 cP to about 35000 cP, e.g., from about 17500 cP to about 32500 cP, from about 20000 cP to about 30000 cP at 160° C. according to an embodiment herein. The viscosity can be measured using any of the test protocol such as ASTM D4287, ISO 2884, and/or BS 3900.

In some embodiments, the HMPSA has elastic modulus (G') of less than the (G') of less than the Dahlquist criterion value of $3 \times 10^5$ Pa at room temperature. In other embodiments, the HMPSA exhibits an elastic modulus (G') in the range from about 70000 Pa to about 140000 Pa at room temperature, e.g., from about 80000 Pa to about 125000 Pa, or from about 90000 Pa to about 110000 Pa.

The HMPSA can additionally include one or more additives, such as one or more antioxidants according to an embodiment herein. In some embodiments, the antioxidant is present in amounts ranging from about 0.5 wt % to about 0.7 wt % of the adhesive.

II. Pressure Sensitive Labels

In one aspect, the subject matter relates to a pressure sensitive label. The pressure sensitive label is constructed out of, or contains, a face stock layer and a pressure sensitive adhesive layer disposed on the face stock layer. In some embodiments, each of the face stock layer and the pressure sensitive adhesive layer contain one or more olefin based polymeric materials. In some embodiments, the pressure sensitive adhesive in the label is the HMPSA as described herein, and the HMPSA is free of any oil containing constituent.

In some embodiments, the HMPSA includes at least one olefin block copolymer; a hydrogenated hydrocarbon tackifier; and a plasticizer. The adhesive additionally may include one or more additives such as antioxidants.

The chemical and physical properties of HMPSA are described above.

In certain embodiments, the pressure sensitive label exhibits an initial adhesion to cardboard at 23° C. from about 4 N/inch to about 9N/inch, and final adhesion after 24 hours at 23° C. from about 3 N/inch to about 6N/inch when measured according to FTM 9.

In some embodiments, the pressure sensitive label demonstrates an adhesion at −5° C. to HDPE from about 0.3N/inch to about 4 N/inch, and adhesion at 40° C. to HDPE from about 8 N/inch to about 12 N/inch when measured according to FTM 9.

In some embodiments, the pressure sensitive adhesive label exhibits an initial adhesion to HDPE at 23° C. from about 6 N/inch to about 13 N/inch and a final adhesion after 24 hours at 23° C. from about 9 N/inch to about 14 N/inch when measured according to FTM 9.

In some embodiments, the coat weight of the HMPSA on the facestock is from about 5 gsm to about 30 gsm, e.g., from about 6 gsm to about 27 gsm, from about 8 gsm to about 25 gsm.

In some embodiments, the face stock is paper or a paper material, e.g., synthetic paper.

It is found that pressure sensitive labels constructed out of the HMPSA described herein and a face stock material containing one or more polyolefin materials results in maintaining a "mono-chemistry" in terms of the chemistry of the materials involved in the construction which when applied to a polyolefin based container/substrate or article ensure the "mono-chemistry" required for recycling streams. Thus, the pressure sensitive adhesive labels as described herein enable recycling.

In some embodiments, the pressure sensitive label further includes a release liner at least partially covering the adhesive disposed of on the face stock. In some embodiments, the release liner covers substantially all of the adhesive layer.

In another aspect, the subject matter relates to a labeled article. The labeled article includes an outer surface, and the pressure sensitive adhesive label as described herein adhered to the article along an outer surface of the article. In some embodiments, the article contains one or more olefinic materials such as HDPE, PP, and copolymers thereof or combinations thereof. The labeled article as described herein maintains the "mono chemistry" in terms of materials employed in different constituents. The labeled article is found to be recyclable in recycling streams.

Examples

Table 1 represents different formulations (Example 1 to Example 5) of the HMPSAs described herein (including OBC) and the relative proportions of individual ingredients such as tackifier, plasticizer and additive (antioxidant). Table 1 also represents a "Control" (in the last column) involving a conventional HMPSA without an OBC and the same tackifier, plasticizer, and antioxidant as the inventive HMPSAs. Absence is represented as -.

TABLE 1

| Ingredients/ Raw Material | Example 1 (Mix 1) | Example 2 (Mix 2) | Example 3 (Mix 3) | Example 4 (Mix 4) | Example 5 (Mix 5) | Control-A representative conventional Hot melt adhesive |
|---|---|---|---|---|---|---|
| Irganox B215 (Antioxidant) | 0.7 | 0.7 | 0.7 | 0.7 | 0.7 | Comprising thermoplastic polymer (SBS, SIS, diblock, triblock), tackifier, plasticizer (oil liquid resin) and additive |
| Infuse D9348.15 (OBC)) | 32.47 | 28.7 | 26.7 | 24.7 | 23.7 | |
| Escorez 5300 (Tackifier) | 39.9 | 41.48 | 45.48 | 49.48 | 51.08 | |
| Indopol H100 (Polybutene Plasticizer) | 26.89 | 29.08 | 27.08 | 25.08 | 24.48 | |

The exemplified adhesive formulations as represented in Table 1 including the control were used along with PP50 (commercially available from Avery Dennison Corporation, of Mentor, Ohio, USA) face stock to construct pressure sensitive labels and BG40BR (commercially available from Avery Dennison Corporation, of Mentor, Ohio, USA) was used as a liner. The labels thus made were then subjected to rheological testing and analysis following established protocol and in normal temperature sweeps. The objective was to assess the adhesion properties of the labels and the adhesives. The results of the rheological tests have been tabulated in the Table 2 below and the graph i.e. the viscoelastic profile

TABLE 2

| Rheological Parameters | Measures | Example 1 (Mix 1) | Example 2 (Mix 2) | Example 3 (Mix 3) | Example 4 (Mix 4) | Example 5 (Mix 5) | Control A representative conventional Hot melt adhesive |
|---|---|---|---|---|---|---|---|
| Tg (° C.) | Tan (delta) | −17.9 | −22.0 | −9.9 | −2.6 | 0.9 | −8.7 |
| Tg (height) | Tan (delta) | 1.69 | 1.77 | 1.87 | 1.93 | 1.98 | 1.19 |
| G' Plateau | (25° C.) Pa | 109986 | 102289 | 81362 | 83305 | 91015 | 113352 |
| Dahlquist | $3 \times 10^5$ Pa (° C.) | 1.1 | −3.4 | 3.0 | 7.8 | 9.9 | 5.3 |
| T cross-over ($2^{nd}$ cross over temperature) | G" > G' (° C.) | 101.6 | 101.6 | 99.5 | 98.3 | 98.4 | 70.3 |

Table 2 results shows that the modulus of all the formulations containing one or more OBCs were better in overall comparison than the "Control". A combined reading of Table 2 and of the viscoelastic profile of the adhesive in FIG. 1 suggests that all OBC containing formulations have increased 2nd cross-over temperature and thus, advantageously involved better heat resistance. It is observable that at least Example 2 (Mix 2), and Example 5 (Mix 5) had flat and extended rubber plateau compared to the control and presented a broad spectrum of operability of adhesion for the OBC containing formulations. Tan delta curves (sharp and high) for the both the formulations were also better than what was obtained for the control (low and wide).

The adhesives of Examples 1-5 as utilized in pressure sensitive labels constructions involving PP50 as face and BG40BR as liner were subsequently tested for rough surface adhesion in cardboard and fiberboard, low surface adhesion in HDPE, and cohesion. The rough surface adhesion test results are represented in Table 3, low surface adhesion test results are represented in Table 4 and the cohesion test results are represented in Table 5. The labels were applied into the substrates at different temperature and initial tack were measured following FTM 9 methods for test captured in Table 3. For Table 4, the initial tack and high speed tack (initial adhesion or loop tack) were measured using FTM 9 with modified speed of 3000 mm/mi. Final adhesions were measured as 90° peel adhesion following FTM 2. The cohesive strength, as in Table 5, is measured using FTM 18 method. The Table 3-5 are herein below.

TABLE 3

| Adhesion (N/inch) | Face Adhesive Formulation Liner | PP Top 50 Example 1 (Mix 1) BG40BR | PP Top 50 Example 2 (Mix 2) BG40BR | PP Top 50 Example 3 (Mix 3) BG40BR | PP Top 50 Example 4 (Mix 4) BG40BR | PP Top 50 Example 5 (Mix 5) BG40BR | PP Top 50 Control- conventional Hot melt Adhesive BG40BR |
|---|---|---|---|---|---|---|---|
| Initial Adhesion @ 23° C. | LTFB | 4.5 | 5.8 | 8.1 | 8.9 | 9.1 | 5.0 |
| | LTCB | 4.2 | 4.3 | 8.3 | 7.7 | 8.4 | 3.8 |
| Final Adhesion @ 23° C. | FB-20 min | 3.4 | 3.5 | 4.7 | 5.2 | 5.1 | 3.4 |
| | FB-24 hrs | 3.6 | 4.1 | 4.6 | 4.5 | 4.3 | 4.1 |
| | CB20 Min | 2.6 | 3.2 | 4.0 | 4.4 | 4.5 | 2.6 |
| | CB24 HRS | 3.2 | 4.2 | 4.7 | 4.7 | 5.5 | 4.2 |

LTFB/LTCB = Loop tack FB/CB; FB = Fiberboard; CB = Cardboard;

TABLE 4

| Adhesion (N/inch) | Face Adhesive Formulation Liner | PP Top 50 Example 1 (Mix 1) BG40BR | PP Top 50 Example 2 (Mix 2) BG40BR | PP Top 50 Example 3 (Mix 3) BG40BR | PP Top 50 Example 4 (Mix 4) BG40BR | PP Top 50 Example 5 (Mix 5) BG40BR | PP Top 50 Control- conventional Hot melt Adhesive BG40BR |
|---|---|---|---|---|---|---|---|
| Apply at different temperature (N/inch) | LTHDPE −5° C. | 0.8 | 3.7 | 0.7 | 0.4 | 0.3 | 2.0 |
| | LTHDPE 1° C. | 4.1 | 9.3 | 2.5 | 0.7 | 0.4 | 6.0 |
| | LTHDPE 5° C. | 4.3 | 9.4 | 3.8 | 1.0 | 0.8 | 11.4 |
| | LTHDPE 10° C. | 7.8 | 11.9 | 4.0 | 1.2 | 0.8 | 11.6 |
| | LTHDPE 15° C. | 10.6 | 9.3 | 10.6 | 5.9 | 6.2 | 12.6 |
| | LTHDPE 23° C. | 7.7 | 6.4 | 8.1 | 11.4 | 12.7 | 10.6 |
| | LTHDPE 40° C. | 9.7 | 8.5 | 8.5 | 10.6 | 11.1 | 10.3 |

TABLE 4-continued

| Adhesion (N/inch) | Face Adhesive Formulation Liner | PP Top 50 Example 1 (Mix 1) BG40BR | PP Top 50 Example 2 (Mix 2) BG40BR | PP Top 50 Example 3 (Mix 3) BG40BR | PP Top 50 Example 4 (Mix 4) BG40BR | PP Top 50 Example 5 (Mix 5) BG40BR | PP Top 50 Control-conventional Hot melt Adhesive BG40BR |
|---|---|---|---|---|---|---|---|
| Initial Adhesion at 23° C. (N/inch) | LTHDPE | 7.7 | 6.4 | 8.1 | 11.4 | 12.7 | 8.9 |
| Initial Adhesion, High Speed, (N/inch) | LTHDPE 23° C. | 9.6 | 9.8 | 4.3 | 2.2 | 2.3 | 0.2 |
| | LTHDPE 5° C. | 0.2 | 0.2 | 0.1 | 0.2 | 0.1 | 9.2 |
| Final Adhesion at 23° C., (N/inch) | HDPE-20 min | 7.7 | 8.0 | 8.3 | 9.9 | 7.6 | 15.6 |
| | HDPE-24 hrs | 9.2 | 10.6 | 11.0 | 13.3 | 12.3 | 8.9 |

TABLE 5

| Measures/Labels | Face Adhesive Formulation Liner | PP Top 50 Example 1 (Mix 1) BG40BR | PP Top 50 Example 2 (Mix 2) BG40BR | PP Top 50 Example 3 (Mix 3) BG40BR | PP Top 50 Example 4 (Mix 4) BG40BR | PP Top 50 Example 5 (Mix 5) BG40BR | PP Top 50 Control-conventional Hot melt Adhesive BG40BR |
|---|---|---|---|---|---|---|---|
| Cohesion | Dynamic Shear, N/inch | 69 | 43 | 74 | 113 | 123 | 45 |

Results as shown in the Table 3 exhibits that rough surface adhesion for cardboard and fiberboard have been considerably better for the labels involving the OBC based adhesive formulations as compared to the control involving traditional hot melt based adhesive. Table 4 shows that labels with OBC adhesive have better adhesion in low temperature and thus, can be adopted in low temperature applications such as chilled food. From Table 6, it is further found that all OBC based adhesive labels have the same or higher level of cohesive strength compared to the control which is advantageous for labeling bottles.

Overall the selected formulation/ingredients and the viscoelastic profile of the adhesives with OBC were found to be appropriate to result in better chemical resistance, better UV resistance, non-swelling. The hot melt pressure sensitive adhesive involving OBC also showed about 30% higher service temperature range compared to the control and exhibited adhesive performance in low temperature (LT) at about 5° C. to 15° C. and room temperature (RT) at about 15° C.-25° C.

Recycling

The hot melt pressure sensitive labels containing OBC were checked for recyclability wherein face materials were selected from any of PP and PE materials or any polyolefin material. The labels so constructed with OBC adhesive (which maintained the "mono-chemistry") were ground together with HDPE chips (resembling substrate article or container to which label is intended to be attached) and then put into extruder and production of new HDPE material (recycled) was attempted. Notably, the process of recycling had no burden of separation of labels or adhesive from the container so as to be useful in the recycle stream which usually makes the recycling of conventional adhesive complex and cumbersome. The recycled HDPE was checked for mechanical properties (elongation, tensile, yield stress) and also extruder pressure all came out to be at acceptable range as would be found almost in virgin HDPE.

In another aspect, the recyclability of the HMPSA together with PP and PE materials or any polyolefin material film were tested using 10-40% of recycled material in the manufacture of new films in the blowing process. It is observed that the recycled materials do not interfere neither with the manufacturing process nor with the mechanical properties of the new PE film thus obtained. It is observed that the new HMPSA can be recycled together with PP and PE materials or any polyolefin material film (e.g. matrix waste) or together with the labelled olefin based package which maintained the "mono-chemistry" as described herein before.

While the invention has been described in detail, modifications within the spirit and scope of the invention will be readily apparent to those of skill in the art. In view of the foregoing discussion, relevant knowledge in the art and references discussed above in connection with the Background and Detailed Description, the disclosures of which are all incorporated herein by reference. In addition, it should be understood that aspects of the invention and portions of various embodiments and various features recited below and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

What is claimed:

1. A hot melt pressure sensitive adhesive (HMPSA), consisting of
   at least one olefin block copolymer;
   a hydrogenated hydrocarbon tackifier; and
   a plasticizer;
   wherein the adhesive is free from any oil containing constituents.

2. The HMPSA of claim 1, wherein the HMPSA consists of from 20 wt % to 40 wt % of the at least one olefin block copolymer.

3. The HMPSA of claim 1, wherein the at least one olefin block copolymer includes at least one crystalline ethylene block and another block including at least one $C_3$-$C_{20}$ alpha-olefin.

4. The HMPSA of claim 3, wherein the at least one crystalline ethylene block is present in the amount of less than about 30% by weight of the at least one olefin block copolymer.

5. The HMPSA of claim 1, wherein the at least one olefin block copolymer has a density in the range of from 0.8624 g/cm$^3$ to 0.8675 g/cm$^3$ and a melt temperature in a range of from 115° C. to 120° C.

6. The HMPSA of claim 1, wherein the at least one olefin block copolymer includes a fully hydrogenated olefin block copolymer.

7. The HMPSA of claim 1, wherein the at least one olefin block copolymer has a glass transition temperature within a range of from about −60° C. to about −40° C.

8. The HMPSA of claim 1, wherein the HMPSA consists of from 35 wt % to 55 wt % of the tackifier.

9. The HMPSA of claim 1, wherein the HMPSA consists of from 10 wt % to 35 wt % of the plasticizer.

10. The HMPSA of claim 1, wherein the HMPSA demonstrates a glass transition temperature (Tg) in a range of −35° C. to 0° C.

11. The HMPSA claim of 1, wherein the HMPSA demonstrates a dynamic shear of at least 40 N/inch.

12. The HMPSA of claim 1, wherein the HMPSA demonstrates a viscosity in a range of from 20000 cP to 30000 cP, measured at 160° C.

13. The HMPSA of claim 1, wherein the HMPSA exhibits an elastic modulus (G') of less than the Dahlquist criterion value of 3×10$^5$ Pa at room temperature.

14. The HMPSA of claim 1, wherein the HMPSA exhibits an elastic modulus (G') in a range of from 90000 Pa-110000 Pa at room temperature.

15. A pressure sensitive label comprising:
    a face stock layer; and
    a layer of the hot melt pressure sensitive adhesive (HMPSA) of claim 1 disposed on the face stock.

16. The pressure sensitive label of claim 15, wherein the hot melt pressure sensitive adhesive demonstrates a glass transition temperature (Tg) in a range of −35° C. to 0° C.

17. The pressure sensitive label of claim 15, wherein the hot melt pressure sensitive adhesive demonstrates a dynamic shear of at least 40 N/inch.

18. The pressure sensitive label of claim 15, wherein the hot melt pressure sensitive adhesive demonstrates a viscosity in a range of from 20000 cP to 30000 cP measured at 160° C.

19. The pressure sensitive label of claim 15, wherein the hot melt pressure sensitive adhesive demonstrates an initial adhesion to cardboard at 23° C. in range of from 4 N/inch to 9 N/inch, and a final addition after 24 hours at 23° C. in a range of from 3 N/inch to 6 N/inch when measured according to FTM 9.

20. The pressure sensitive label of claim 15, wherein the hot melt pressure sensitive adhesive demonstrates an adhesion at −5° C. to high-density polyethylene (HDPE) in a range of 0.3 N/inch to 4 N/inch, and adhesion at 40° C. to HDPE in a range of from 8 N/inch to 12 N/inch when measured according to FTM 9.

21. The pressure sensitive label of claim 15, wherein the hot melt pressure sensitive adhesive demonstrates an initial adhesion to HDPE at 23° C. in a range of 6 N/inch to 13 N/inch, and a final adhesion after 24 hours at 23° C. in a range of from 9 N/inch to 14 N/inch when measured according to FTM 9.

22. The pressure sensitive label of claim 15, wherein the hot melt pressure sensitive adhesive is present in a coat weight in a range of from 8 gsm to 25 gsm.

23. The pressure sensitive label of claim 15, wherein the hot melt pressure sensitive adhesive consist of from 20 wt % to 40 wt % of the olefin block copolymer.

24. The pressure sensitive label of claim 15, wherein the hot melt pressure sensitive adhesive consist of from 35 wt % to 55 wt % of the tackifier.

25. The pressure sensitive label of claim 15, wherein the hot melt pressure sensitive adhesive consist of from 10 wt % to 35 wt % of the plasticizer.

26. The pressure sensitive label of claim 15, wherein the plasticizer is a polybutene plasticizer.

27. The pressure sensitive label of claim 15, wherein the face stock consists essentially of a polymer selected from the group consisting of polyethylene terephthalate (PET), a polyamide, and a polyolefin; wherein the polyolefin is selected from the group consisting of polypropylene and polyethylene.

28. The pressure sensitive label of claim 15, further comprising a release liner at least partially covering the layer of hot melt pressure sensitive adhesive.

29. The pressure sensitive label of claim 15, wherein the hot melt pressure sensitive adhesive exhibits an elastic modulus (G') of less than the Dahlquist criterion value of 3×10$^5$ Pa at room temperature.

30. The pressure sensitive label of claim 15, where in the hot melt pressure sensitive adhesive exhibits an elastic modulus (G') in a range of from 90000 Pa-110000 Pa at room temperature.

31. A labelled article comprising:
    an article having an outer surface; and
    the label of claim 15 being attached to the article along the outer surface of the article; wherein the article comprises an olefin based polymer.

32. The labelled article of claim 31, wherein the olefin based polymer is high-density polyethylene (HDPE), polypropylene (PP), or combinations thereof.

33. The labelled article of claim 31, wherein the article is recyclable in recycling streams of material selected from the group consisting of HDPE, PP or combinations thereof.

* * * * *